(12) United States Patent
Hartvigsen et al.

(10) Patent No.: US 9,199,215 B2
(45) Date of Patent: Dec. 1, 2015

(54) COMPACT FISCHER TROPSCH SYSTEM WITH INTEGRATED PRIMARY AND SECONDARY BED TEMPERATURE CONTROL

(71) Applicant: Ceramatec, Inc., Salt Lake City, UT (US)

(72) Inventors: Joseph J. Hartvigsen, Kaysville, UT (US); S. Elangovan, South Jordan, UT (US); Lyman Joseph Frost, Idaho Falls, ID (US)

(73) Assignee: CERAMATEC, INC., Salt Lake City, UT (US)

( * ) Notice: Subject to any disclaimer, the term of this patent is extended or adjusted under 35 U.S.C. 154(b) by 348 days.

(21) Appl. No.: 13/770,728

(22) Filed: Feb. 19, 2013

(65) Prior Publication Data

US 2013/0216448 A1    Aug. 22, 2013

Related U.S. Application Data (60) Provisional application No. 61/601,134, filed on Feb. 21, 2012.

(51) Int. Cl.
| | |
|---|---|
| *B01J 8/06* | (2006.01) |
| *B01J 19/00* | (2006.01) |
| *C10G 2/00* | (2006.01) |
| *B01J 35/00* | (2006.01) |
| *B01J 35/06* | (2006.01) |

(52) U.S. Cl.
CPC .............. *B01J 19/0013* (2013.01); *B01J 8/067* (2013.01); *C10G 2/32* (2013.01); *B01J 35/0013* (2013.01); *B01J 35/06* (2013.01); *B01J 2208/0053* (2013.01); *B01J 2208/00212* (2013.01); *B01J 2208/00221* (2013.01)

(58) Field of Classification Search
CPC .................................. B01J 8/067; C10G 2/341
USPC ........................................................... 422/659
See application file for complete search history.

(56) References Cited

U.S. PATENT DOCUMENTS

| | | |
|---|---|---|
| 2,895,508 A | 7/1959 | Drake |
| 3,147,084 A | 9/1964 | Franzen et al. |
| 3,612,584 A | 10/1971 | Taylor |

(Continued)

FOREIGN PATENT DOCUMENTS

| | | |
|---|---|---|
| KR | 10-0901736 | 6/2009 |
| KR | 10-2011-0037640 | 4/2011 |

(Continued)

OTHER PUBLICATIONS

Kim, Dong S., "International Search Report", PCT/US2013/026203, (Jun. 13, 2013),1-3.

(Continued)

*Primary Examiner* — Lessanework Seifu
(74) *Attorney, Agent, or Firm* — David Fonda (57) ABSTRACT

A Fischer Tropsch ("FT") reactor includes at least one FT tube. The FT tube may include a catalyst that is designed to catalyze an FT reaction, thereby creating a hydrocarbon from syngas. The FT reactor also includes a primary cooling fluid flow path that extends in a direction that is substantially parallel to the longitudinal length of the FT tube. A secondary cooling fluid flow path extends in a direction that is different than the direction of the primary cooling fluid flow path.

15 Claims, 7 Drawing Sheets

(56) References Cited

U.S. PATENT DOCUMENTS

| | | | |
|---|---|---|---|
| 3,857,680 | A | 12/1974 | Porta et al. |
| 7,018,591 | B2 * | 3/2006 | Le ................................ 422/201 |
| 7,501,012 | B2 | 3/2009 | Tatarchuk et al. |
| 8,069,678 | B1 | 12/2011 | Bernert |
| 2002/0048541 | A1 | 4/2002 | Schodel et al. |
| 2003/0175173 | A1 | 9/2003 | Karisson |
| 2003/0180201 | A1 | 9/2003 | Belt et al. |
| 2004/0192989 | A1 | 9/2004 | Espinoza et al. |
| 2005/0080147 | A1 | 4/2005 | Hawthorne et al. |
| 2007/0003460 | A1 | 1/2007 | Matsumoto et al. |
| 2007/0036697 | A1 | 2/2007 | Gutlhuber et al. |
| 2007/0299148 | A1 | 12/2007 | Verbist |
| 2009/0038155 | A1 | 2/2009 | Corry |
| 2009/0215911 | A1 | 8/2009 | Wang et al. |
| 2009/0220389 | A1 | 9/2009 | Onishi et al. |
| 2009/0269258 | A1 | 10/2009 | Yi et al. |
| 2010/0160463 | A1 | 6/2010 | Wang et al. |
| 2010/0303683 | A1 | 12/2010 | Hendrie et al. |
| 2010/0307726 | A1 | 12/2010 | Chiu et al. |
| 2010/0324158 | A1 | 12/2010 | Bowe et al. |
| 2011/0160318 | A1 | 6/2011 | Bos et al. |

FOREIGN PATENT DOCUMENTS

| | | |
|---|---|---|
| WO | WO-2010130399 | 11/2010 |
| WO | 2012131385 A3 | 11/2012 |

OTHER PUBLICATIONS

Kim, Dong S., "Written Opinion of the International Searching Authority", PCT/US2013/026203, (Jun. 13, 2013),1-4.

Kim, Dong S., "International Search Report", PCT/US2013/026939, (Jun. 29, 2013),1-3.

Kim, Dong S., "Written Opinion of the International Searching Authority", PCT/US2013/026939, (Jun. 29, 2013),1-4.

Kim, Dong S., "International Search Report", PCT/US2013/026721, (Jun. 3, 2013),1-4.

Kim, Dong S., "Written Opinion of the International Searching Authority", PCT/US2013/026721, (Jun. 3, 2013),1-6.

Lee, et al., "Bibliography and English Abstract", KR 10-0901736, (Jun. 9, 2009),1-2.

Lee, et al., "Bibliography and English Abstract", KR 10-2011-0037640, (Apr. 13, 2011),1-2.

Guettel, Robert et al., "Reactors for Fischer-Tropsch Synthesis", *Chemical Engineering & Technology*, 2008, vol. 31, Issue 5, (Apr. 22, 2008),746-754.

Young, Natasha E., "Non Final Office Action", U.S. Appl. No. 13/772,080, (Dec. 16, 2014),1-13.

Nguyen, Huy T., "Non Final Office Action", U.S. Appl. No. 13/767,604, (May 7, 2014),1-17.

Nguyen, Huy T., "Final Office Action", U.S. Appl. No. 13/767,604, (Oct. 21, 2014),1-15.

Nguyen, Huy T., "Notice of Allowance", U.S. Appl. No. 13/767,604, (Jan. 5, 2015),1-10.

* cited by examiner

COMPACT FISCHER TROPSCH SYSTEM WITH INTEGRATED PRIMARY AND SECONDARY BED TEMPERATURE CONTROL

RELATED APPLICATIONS

This application claims the benefit of U.S. Provisional Patent Application Ser. No. 61/601,134 filed Feb. 21, 2012. This prior provisional application is expressly incorporated herein by reference.

TECHNICAL FIELD

The present disclosure relates to devices and methods for more efficiently performing Fischer Tropsch ("FT") processing of a syngas stream. More specifically, the present disclosure relates to a device and method for FT processing with improved catalyst and temperature control for more efficient results.

BACKGROUND

The Fischer Tropsch ("FT") process, which is sometimes called FT synthesis, is a chemical reaction used routinely in oil and gas processing. This process involves the conversion of carbon monoxide and hydrogen gas into a hydrocarbon chain and water. This reaction may be summarized as follows:

$$CO + 2H_2 \rightarrow -CH_2- + H_2O \quad \Delta H = -165 \text{ KJ/mol}$$

Generally, a catalyst is used in this reaction. This FT process usually occurs at high temperatures and high pressures, such as, for example, at pressures of 150-300 psig and temperatures ranging from 200-300° C. (The input stream that is input into the FT reaction vessel is often called synthesis gas or "syngas"). FT technology provides a method for conversion of carbon and hydrogen containing streams from one form (e.g. standard natural gas, biomass, or a mixture of carbon and hydrogen containing materials in gas, liquid, or solid forms) to another form (e.g. kerosene & diesel fuel). In general, the initial mixture of carbon and hydrogen containing material is converted to syngas prior to the introduction into an FT reactor, although the conversion itself could occur over a catalyst in the FT reactor.

The FT process will generally produce a mixture of liquid and gaseous hydrocarbons (—$CH_2$— molecules). In general, the liquid hydrocarbons (such as octane, hexane, and others hydrocarbons with carbon numbers of 5 or greater) tend to be more valuable than the gaseous products (such as methane, ethane, etc.) because these liquid products may be used in producing kerosene, diesel fuel and other desirable products.

The FT process is highly exothermic (with a $\Delta H = -165$ KJ/mol). If the produced heat is not removed as part of the reaction conditions, the metallic catalyst can be damaged and the products generated will tend to be gases rather than the more valuable liquids and gases. Further, care must be taken to insure that sulfur-containing compounds are not part of the syngas as these chemicals tend to poison the catalysts, thereby causing the reaction to fail.

Accordingly, there is a need in the art for a new device and method for FT processing that is more efficient and will better remove the heat produced during the reaction, thereby ensuring that the more valuable liquids are produced during the process. Such a device and method is disclosed herein.

SUMMARY

The present embodiments relate to methods for flowing coolant fluid in an FT reactor design, so that the coolant may better absorb/dissipate the heat that is produced by the FT reactor tube. Specifically, the present embodiments involve placing at least one FT reactor tube (having catalyst contained therein for conducting an FT reaction) and placing these reactor tubes within an outer external pipe. Fluid (e.g. water, Therminol, Dowtherm and the like) is circulated through the annulus between the FT reactor tubes and external pipe to remove the heat conducted to the wall of the FT reactor tubes. In this manner, the coolant thus flows along the longitudinal length of the FT reactor tubes (e.g. around the outside of each FT reactor tube.) This flow of the coolant may generally be in a substantially axial direction.

At the same time, a secondary flow of coolant, along a secondary flow path, is also created. This secondary flow path also occurs within the external pipe. Specifically, the external pipe is divided into zones with internal baffles and entry-exit points for a secondary cooling fluid. Since the reactor tube assemblies are expected to be between 6-40 feet in length, the primary cooling described above may not result in even bed temperatures throughout the total length of the system. Since heat will be absorbed by the cooling fluid as it passes through the annulus of the reactor tube assembly described, the cooling fluid will obviously be warmer as it passes further along the longitudinal length of the FT tube. This reduction in $\Delta T$ will result in less efficient heat transfer and reactor temperature uniformity. However, by providing a secondary cooling loop, heat can be extracted from the primary loop and even bed temperature maintained throughout the length of the reactor tube assembly. Providing the ability to vary volume of cooling fluid, temperature of that fluid, and even type of fluid by zone within the larger vessel gives the optimal chance of maintaining even catalyst bed temperatures within the reactor tube assemblies. It also reduces the total coolant flow rate compared with a primary coolant only system since in that case very high flow rates would be required to minimize temperature rise along the length of the reactor tube.

A key issue with fixed bed Fischer Tropsch (FT) reactors is the control of catalyst bed temperatures. FT is highly exothermic. If heat is not removed, the catalyst can be damaged and the products generated tend to be gases rather than the more valuable liquids and gases. The system of the present invention addresses temperature control.

Since a primary application of the FT system is conversion of natural gas to liquids, any increase in liquid and wax yields is of interest. Combining the idea of primary and secondary heat extraction with liquids with a microfibrous structure support for heat conduction within the bed should result in: (1) higher proportional yields of liquid and wax product; (2) ability to use larger tubular reactors (i.e. reduction in capital cost); and (3) consistent bed temperatures prolonging catalyst life and enhancing product yields.

DETAILED DESCRIPTION

The present embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the methods and cells of the present invention, as represented in the Figures, is not intended to limit the scope of the invention, as claimed, but is merely representative of present embodiments of the invention.

Fischer Tropsch (FT) processing is a method for the production of various hydrocarbons from the input of synthesis gas. It is a surface catalyzed carbon polymerization process that largely produces straight chain hydrocarbons that range from $C_1$ to greater than $C_{100}$ hydrocarbon products. These products generally follow a distribution called the ASF (Anderson-Schultz-Flory) distribution defined by the chain growth probability factor ("$\alpha$") that is a strong function of temperature. Maintaining the temperature of the catalyst bed at an even temperature is important since higher bed temperatures tend to favor the formation of more of the gaseous (i.e. lower value) products while lower temperatures tend to favor production of waxes that are not easily transported by pipeline or directly usable as fuel. In other words, one of the purposes of this invention is to create a large tubular, fixed bed FT reactor and controlling the temperature of the catalyst bed within the reactor to prevent catalyst damage and improve yields in the liquid and wax range of FT products.

The ASF chain growth probability factor ($\alpha$) decreases by about 0.004/° C. increase in catalyst temperature. This means that a 15° C. variation in local temperature would mean a 0.06 shift in alpha which has a major impact on the product distribution. For example if the optimal alpha value for a desired liquid product was about 0.85, portions of the reactor 15° C. cooler would have an alpha of 0.91 and make too much wax while portions of the reactor 15° C. hotter would make less liquid and too much gas as product. Accordingly, it is desirable to find systems that will control the temperature along the entire length of the FT reactor, and thus, the alpha value, to provide consistent results.

Figure 1:
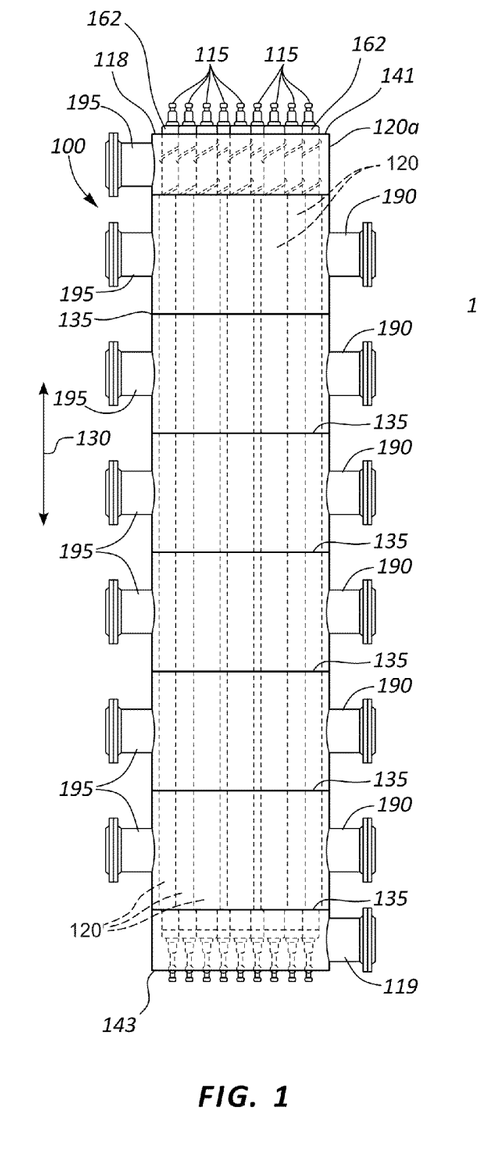
FIG. 1 shows a side perspective view of an FT reactor unit.

Referring now to FIG. 1, a Fischer Tropsch ("FT") reactor 100 is shown. The FT reactor 100 is designed such that it includes one or more FT tubes 110. As is known in the art, the FT tubes 110 are filled with a catalyst (not shown) and are designed such that syngas may be passed through the FT tubes 110. When this gas is passed through the FT tubes, a Fischer Tropsch reaction occurs to produce a hydrocarbon product. The FT reactor 100 typically operates at pressures of 150-300 psig and temperatures ranging from 200-300° Celsius. Those skilled in the art will appreciate how the FT tubes 110 may be constructed (of metal etc.) and designed such that an FT reaction may occur therein.

A receiving cap 115 may be added to the FT tubes 110. The receiving cap 115 is designed to pressurize the tube and to receive the flow of the syngas. All of the FT tubes 110 may have a cap 115 in some embodiments.

Figure 3:
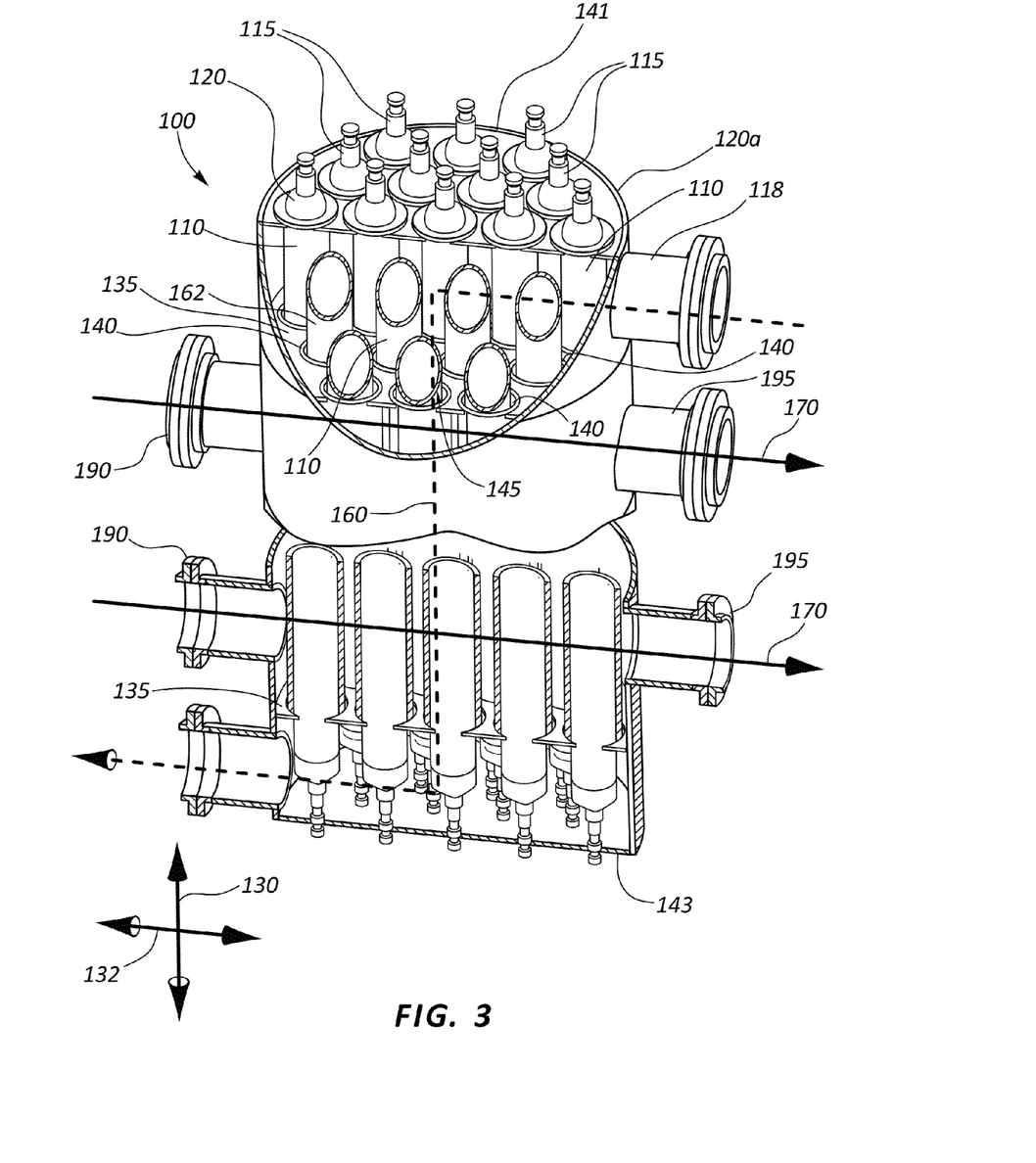
FIG. 3 shows a partially cutaway perspective view of the FT reactor unit of FIG. 1.

The FT tubes 110 may each be housed within an external pipe 120 (shown in FIG. 3). In turn, each of the external tubes is housed within an outer shell 120a. The external pipes 120 are a component of the reactor 100. It should be noted that, in the embodiment shown in FIG. 1, the external pipes 120 and the FT tubes 110 are cylindrical structures, having a longitudinal direction 130. This longitudinal direction 130 may be substantially axial. Of course, in other embodiments, the longitudinal direction 130 may not be substantially axial, but may be oriented in another direction.

Inside the outer shell 120a may also be one or more baffles 135. The baffles 135 may be made of metal and may be perpendicular or substantially perpendicular to the longitudinal direction 130.

Although a plurality of single baffles 135 are shown in FIG. 1, those skilled in the art will appreciate that a different number of baffles 135, or even a single baffle 135, may be used. Each baffle 135 may include one or more openings 140 (shown in FIG. 3) so that the FT tubes 110 may pass through the baffles 135. As shown in FIG. 3, the diameter of the openings 140 is larger than the diameter of the FT tubes 110, such that there is an annulus 145 (shown in FIG. 4) created around each of the FT tubes 110.

The outer shell 120a may further include a primary cooling fluid inlet 118 and a primary cooling fluid outlet 119. A primary cooling fluid (not shown in FIG. 1) may be housed in a reservoir (not shown in FIG. 1) and then may enter the external pipe 120. The purpose of the annulus 145 is so that a first quantity of cooling fluid (not shown in FIG. 1) may flow in the longitudinal direction 130. In other words, once the fluid enters the shell 120a through the inlet 118, the fluid will flow in a direction that is parallel or substantially to the longitudinal direction 130. (Substantially parallel means that a direction that is nearly parallel to the longitudinal direction 130.) More specifically, the first quantity of cooling fluid 150 may flow axially (or substantially axially) from the inlet 118 (that is positioned at or near the top 141 of the shell 120a), pass through each baffle 135 by passing through the various annuluses 145, and thus exit the shell 120a proximate the bottom 143 of the shell 120a via the outlet 119. This flow of cooling fluid in a longitudinal direction may be referred to herein as a "primary cooling fluid flow path." In this manner, as heat is produced by the FT tube 110 (e.g., during the FT reaction) will be conducted to the wall 162 of the FT tube 110, and once at the wall 162, the cooling fluid that surrounds the outside of the FT tube 110 may collect the heat and remove this heat. In this manner, the cooling fluid 150 may operate to maintain the FT tube 110 at a desired temperature.

The cooling fluid may be circulated through the annuluses 145 between the reactor tube 110 and external pipe 120 (shown in FIG. 3) to remove the heat conducted to the wall 162. In the embodiment shown in FIG. 1, the first quantity of cooling fluid flows is generally downward direction, e.g., from the top of the external pipe 120 to the bottom of the external pipe 120. Once out of the external pipe 120, the cooling fluid may be collected and re-circulated to a reservoir. Those skilled in the art will appreciate that other embodiments may be designed in which the first quantity of cooling fluid flows in a generally upwards direction (due to the pressure) such that it starts at the bottom of the external pipe 120 and flows to the top of the external pipe 120, where it is collected and re-circulated. Both upwards and downwards flow patterns are easily constructable. Other flow patterns for the first cooling fluid are also possible.

Referring still to FIG. 1, the outer shell 120a may further comprise secondary inlets 190 and secondary outlets 195. More specifically, the use of the baffles 135 also allows for a secondary cooling fluid path, in which a different quantity of cooling fluid flows in a different direction, thereby adding an additional cooling effect. Specifically, proximate each baffle 135 is a secondary inlet 190 and a secondary outlet 195 through which a second quantity of cooling fluid (not shown in FIG. 1) may flow. This second quantity of cooling fluid may be the same cooling fluid as the first quantity of fluid (and derived from the same reservoir) or may be a different fluid or from a different reservoir.

In the embodiment shown in FIG. 1, the secondary cooling fluid flow path is horizontal or substantially horizontal to the primary cooling fluid flow path. (Thus, the secondary cooling fluid flow path is perpendicular or substantially perpendicular to the primary cooling fluid flow path.) However, this depiction is not limiting. As long as the secondary cooling flow path is in a direction that is different than the primary cooling flow path, the secondary cooling flow path will exist. By providing a secondary cooling loop (that is formed by the secondary cooling flow path), heat can be extracted from the primary loop and even bed temperature maintained throughout the length of the reactor 100.

Figure 2:
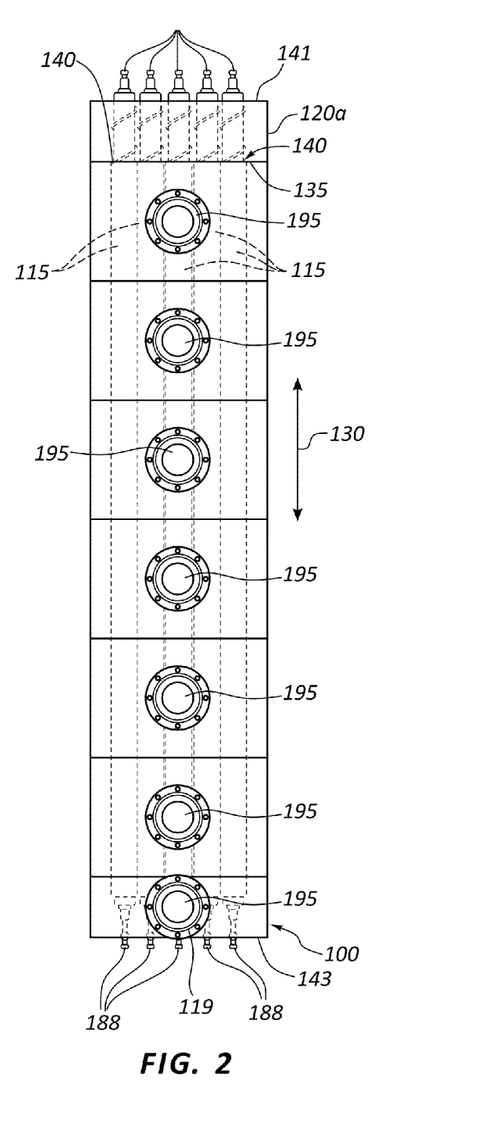
FIG. 2 is a different side view of the FT reactor unit of FIG. 1.

FIG. 2 is a side perspective view of the assembly 100. As can be seen in FIG. 2, the shell 120a is designed such that the reactor tubes 110 have bottom caps 188 extend out the bottom of the shell 120a. This design allows the reactor tubes 110 to be pressurized (so that the FT reaction may occur). These caps may further be designed so that the products of the FT reaction may be obtained, piped, etc. for further processing.

Referring now to FIG. 3, a partially cutaway perspective view of the FT reactor 100 is illustrated. In the view shown in FIG. 3, a portion of the external tubes 120 and the shell 120a have been cutaway so that the structure of the baffles 135 may be seen. Further, the view shown in FIG. 3 is broken away so that only the top-most and bottom-most baffles 135 are shown (e.g., the baffle 135 that is most proximate the top 141 of the shell 120a and the baffle 135 that is most proximate the bottom of the shell 120a). Also, some of the caps 115 have been removed in FIG. 3. Of course, this view is shown for clarity purposes only.

With reference to FIG. 3, the primary and secondary cooling fluid flow paths will be described. Specifically, the primary cooling fluid flow path is represented by arrow 160. (The primary cooling fluid flow path may also be referred to herein as the "first cooling fluid flow path.") In another embodiment, the direction of flow of primary coolant may be the reverse of what is shown by arrow 160. A first quantity of cooling fluid (not shown in FIG. 3) will enter the external pipe 120 via the inlet 118 and then, will flow axially (e.g., parallel to or substantially parallel to the longitudinal direction 130). In order to flow in this manner, the first quantity of cooling fluid will pass through the annuluses 145 in the baffles 135. By passing through the annuluses 145, between the FT tube 110 and external pipe 120, the cooling fluid will surround and/or envelop the outside of each reactor tube 110. Thus, as the reactor tube 110 is reacted, and heat is produced, this heat will be transferred to the wall 162 of the tube 110. By having the cooling fluid surround and envelop the tube 110, this produced heat may be dissipated at the wall 162 via the cooling fluid. Once the cooling fluid reaches the outlet 119 (proximate the bottom 143 of the shell 120a), the first cooling fluid may exit the shell 120a so that the fluid may be re-circulated, re-used, etc.

Figure 4:
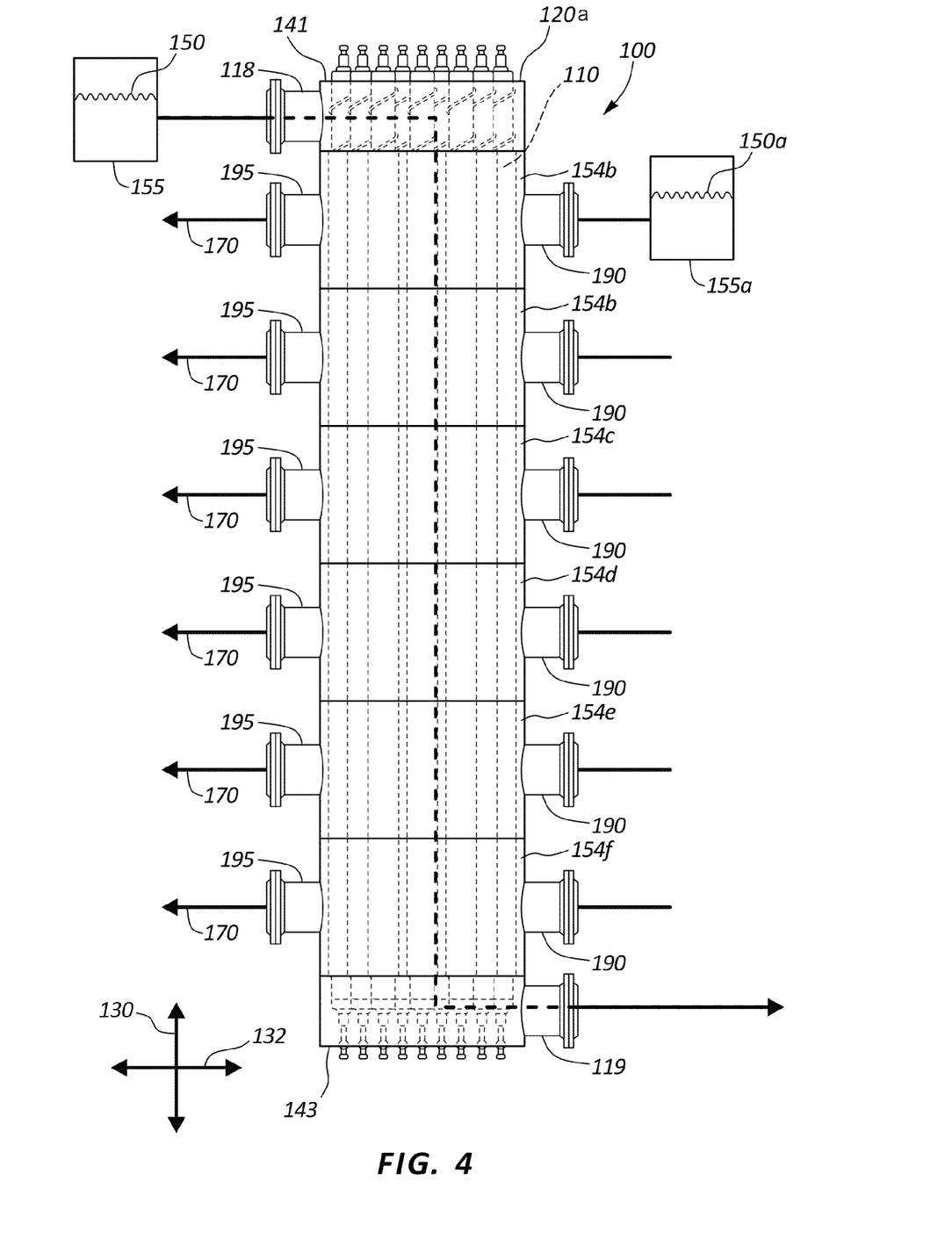
FIG. 4 shows another side view of the reactor unit of FIG. 1.

At the same time, the reactor 100 also has one or more secondary cooling fluid flow path that is represented by arrows 170. The presence of the baffles 135 means that the shell may be 120a separated into a plurality of chambers. (These 154a-f are shown in FIG. 4). The fluid in the secondary cooling loop flows within the shell 120a and across the outside of the plurality of external pipers 120. Each chamber has its own inlet 190 and outlet 195. Thus, a second quantity of cooling fluid may be introduced to a specific chamber by having the fluid enter at the inlet 190. Once in the chamber, the second fluid will flow in along the second flow path 170 until it exits the chamber via outlet 190. It should be noted that the second cooling fluid flow path 170 is different than the first cooling fluid flow path 160. In the embodiment shown in FIG. 3, the second cooling fluid flow path 170 is in the horizontal direction 132, which is perpendicular or substantially perpendicular to the longitudinal direction 130. Of course, other embodiments may be designed in which the second cooling fluid flow path 170 is not perpendicular or substantially perpendicular to the first cooling fluid flow path 160.

Because each chamber has its own inlet and outlet 190, 195, the volume of cooling fluid, temperature of that fluid, and even type of fluid by zone may be varied within the larger outer shell 120a, thereby giving the optimal chance of maintaining even catalyst bed temperatures within the reactor tube assemblies. In fact, the second quantity of cooling fluid (not shown in FIG. 3) may be allowed to boil, if desired, within one or more of the zones as a means of absorbing additional heat produced by the FT reaction tubes 110. The first quantity of cooling fluid may not boil as it travels longitudinally, but the second quantity of fluid may indeed boil, adjust its volume, etc. in order to further dissipate heat. Thus, the operator may vary all of the relevant conditions in each of the secondary cooling zones in order to maintain the FT reaction tubes at a substantially uniform temperature along their entire longitudinal length. The use of this secondary cooling fluid flow path may also reduce the total coolant flow rate compared with a primary coolant only system since in that case very high flow rates would be required to minimize temperature rise along the length of the reactor tube.

FIG. 4 is another side perspective view of the FT reactor 100 that is similar to FIG. 1. FIG. 4 also shows the primary and secondary cooling fluid flow paths 160, 170. Additionally, FIG. 4 shows a first quantity of cooling fluid 150 that is housed in a reservoir 155. The first quantity of cooling fluid 150 flows along the primary cooling fluid flow path 160. More specifically, the first quantity of fluid 150 enters the outer shell 120a via the inlet 118. (The fluid 150 may access the inlet 118 from the reservoir 155 via piping, which is not shown). Once inside the outer shell 120a, the first quantity of cooling fluid 150 flows longitudinally through the annuluses between the external pipe 120 and the FT tube 110. The external pipe 120 in turn passes through the baffles 135. The baffles 135 divide the secondary cooling loop flows into multiple zones on the outer side of the external pipe 120. This longitudinally flow operates to surround and envelop the FT reactor tubes 110, thereby dissipating the heat produced during the FT reaction. Once the first quantity of cooling fluid 150 reaches the outlet 119, the first quantity of fluid 150 may leave the external pipe 120 and may be re-cycled, returned to the reservoir 155, used again to flow through the external pipe 120, etc. In another embodiment, the direction of flow of secondary coolant may be the reverse of what is shown by arrow 170.

A second quantity of cooling fluid 150a is also shown in FIG. 4. This second quantity of cooling fluid 150a may be housed within a second reservoir 155a. Although FIG. 4 shows the use of two separate reservoirs 155, 155a, those skilled in the art will appreciate that embodiments may be constructed in which only a single reservoir is used. Further, the second quantity of cooling fluid 150a may be the same fluid as the first quantity of cooling fluid 150 or may be different fluid altogether. The second quantity of cooling fluid 150a may also be at a different temperature and pressure from that of the primary cooling fluid 150.

The second quantity of cooling fluid 150a may flow along the secondary cooling fluid flow path 170. In the depiction of FIG. 4, the second cooling fluid 150a is shown only going through chamber 154 and not through the other chambers 154b-154f. This depiction is made for illustrative purposes only. Those skilled in the art will appreciate that the reservoir 155a may be connected to all of the inlets 190, and thus the second cooling fluid 150a may flow into all of the chambers 154a-154f.

As described above, the direction of the fluid flow along the secondary cooling fluid flow path 160 is different than the fluid flow along the primary cooling fluid flow path 170. In this depiction, the second cooling fluid 150a flows in a perpendicular or cross-flow direction 132. As each chamber 154a-154f has its own inlet and outlet, the flow through each chamber, the temperature of each chamber, etc. may be optimized to ensure that proper cooling occurs and may ensure that the entire longitudinal length of the FT tubes 110 remains at or near a constant temperature. This ability to unify the temperature across the entire longitudinal length produces more consistent results in the FT reaction tubes 110.

It should be noted that placement of the FT tubes 110 and external pipes 120 within the larger vessel (outer shell 120a) for the FT system 100, as well as the number of tubes 110, depends on the size of the external vessel. The design allows for a secondary pressure boundary at the wall of the outer shell 120a if desired. The secondary pressure boundary is primarily for coolant containment while the primary pressure boundary of FT tube 110 contains the reactant syngas and FT product streams at generally much higher pressures. Placing the primary boundary at the inner wall of the reactor tube assembly allows for minimization of capital cost.

A further benefit of this embodiment is that the reactor tubes 110 are completely removable from the primary cooling path 160 without disturbing any piping in the primary coolant and without necessitating any change in the flow of secondary coolant. This allows reactor tubes 110 with spent catalyst to be exchanged with preloaded fresh catalyst with a minimum disruption of the system.

It should be noted that the catalyst that is used within the FT tube 110 may be a metallic, microfibrous entrapped catalyst ("MFEC") for the FT catalyst. These types of catalysts are described in U.S. Provisional Patent Application Ser. No. 61/601,103 filed Feb. 21, 2012, which application incorporated herein by reference. The MFEC reactor charge has a much higher thermal conductivity that enables the transfer of heat from the interior of the catalyst bed to the reactor wall. Laboratory measurements have indicated that the MFEC transfers approximately 50 times as much heat as a traditional packed bed catalyst approach. The MFEC has the additional benefit of promoting interaction between the FT catalyst and the input synthesis gas feedstock. The high heat transfer controls the radial heat distribution in the reactor.

Figure 5A:
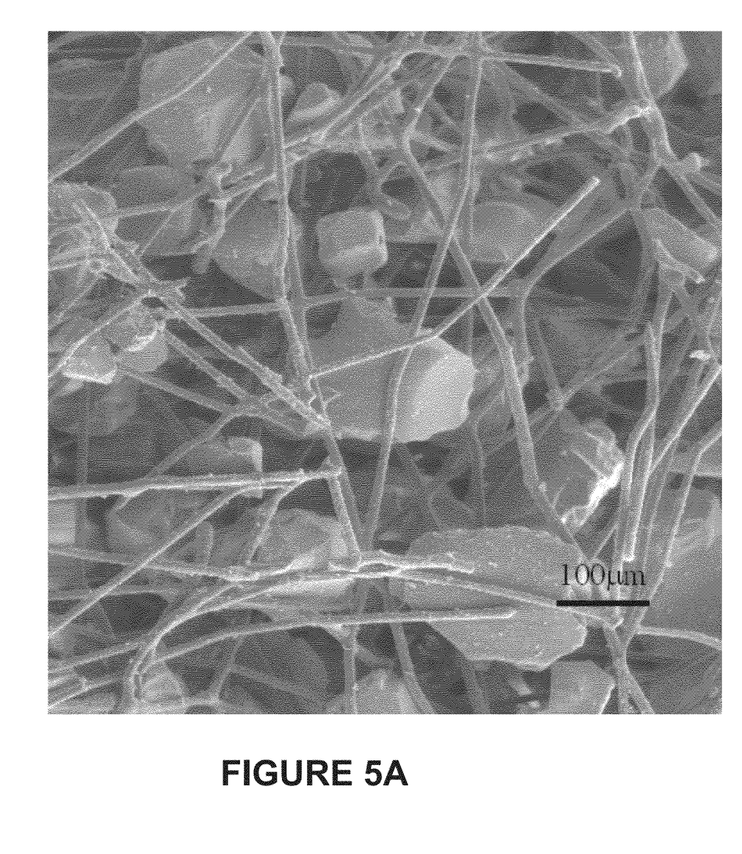
FIG. 5A is a photomicrograph of nano-particles of a catalyst in a micro-fibrous structure.
Figure 6:
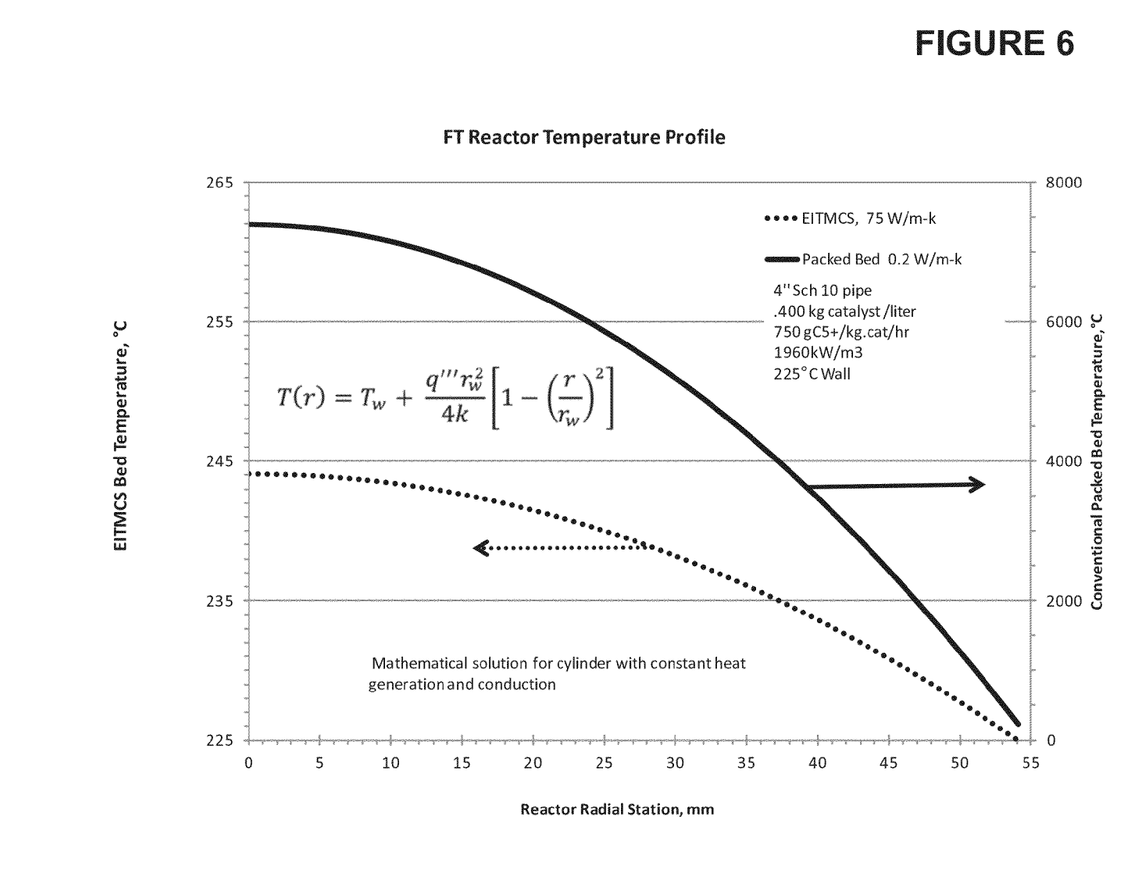
FIG. 6 is a graph showing the temperature profile in a cylinder with constant heat generation.

As will be appreciated by those skilled in the art, the FT reactor tube is designed such that reactant carbon monoxide and hydrogen gas may be converted into water and a hydrocarbon. Of course, in order to conduct this reaction, a catalyst may be involved. The present embodiment of FT reactor tube may use any type of catalyst/catalyst structure. However, one particular type of catalyst that has been found to be effective is an FT catalyst that has been dispersed within the tubular structures of the compact tube using technology that provides a micro-fibrous substrate for dispersal of nano-sized FT catalyst. A photomicrograph of a typical micro-fibrous structure is shown in FIG. 5A. The use of this type of substrate could assist in solving many of the traditional problems with a fixed bed FT unit. The micro-fibrous structure breaks up flow and thus promotes a more even distribution of the synthesis gas through the FT synthesis tube. Further, a micro-fibrous structure is believed to provide increased activity by the better utilization of the supported structure (see data in FIG. 6 showing breakthrough extension using nano-sized zinc oxide for removal of sulfur from a gaseous stream). Proper selection of the micro-fibrous structure could also promote heat transfer (i.e., use of a metallic material for the removal of heat from the highly exothermic FT process and conveying it to the walls of the unit). Those skilled in the art will appreciate what materials may be used as the micro-fibrous material. Since excess heat promotes growth of undesirable light gaseous hydrocarbons, removal of heat has limited the use of fixed bed FT units.

Figure 5B:
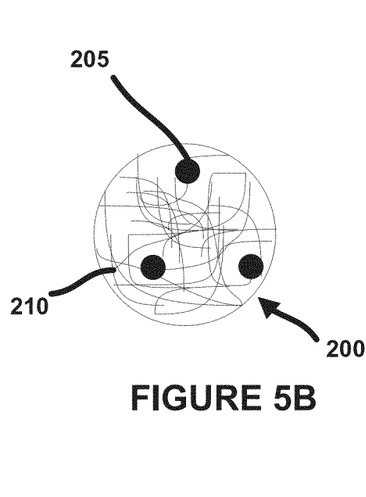
FIG. 5B is a schematic representation of the micro-graph of FIG. 5A.

FIG. 5B is a schematic representation of the photomicrograph of FIG. 5A. As shown in FIG. 5B, the catalyst 200 comprises the metallic catalyst 205 (which is a nano-particle) that is nano-dispersed micro-fibrous material 210. As shown in FIG. 5B, the nano-particle catalyst 205 are shown as circles, although those skilled in the art will appreciate that this representation is made for clarity and that other particle shapes may be used. The catalyst 200 (e.g., the nano-dispersed micro-fibrous material 210 and the nano-particle catalyst 205 are packed within the FT reactor tube (not shown in FIGS. 5A and 5B) and the syngas is allowed to pass through the tube, thereby causing an FT reaction to occur. Further, FIG. 5B shows that syngas 220 is added to the reactor tube and, while in the tube, an FT reaction occurs such that a hydrocarbon material 230 is produced.

Experiments demonstrate a much later breakthrough of catalyst-poisoning sulfur species when a microfiber support is used in a sulfur sorbent reactor. The clear implication is better mass transfer and catalyst effectiveness or reactant utilization factor resulting from the use of very small particles suspended by the microfibers. The proposed structure would allow longer use of a catalyst bed for a given length of tube in the FT unit or through the increased activity a shorter tube for a set time of use. Since the micro-fibrous structure would also form an easily removable catalyst bed, the time required for replacement of catalyst would be reduced. This would increase total availability of the unit.

Although some of the present embodiments involve the use of micro-fiber technology in the catalyst, those skilled in the art will appreciate that other embodiments may be constructed in which other types of catalysts, including conventional catalysts, are used.

Figure 7:
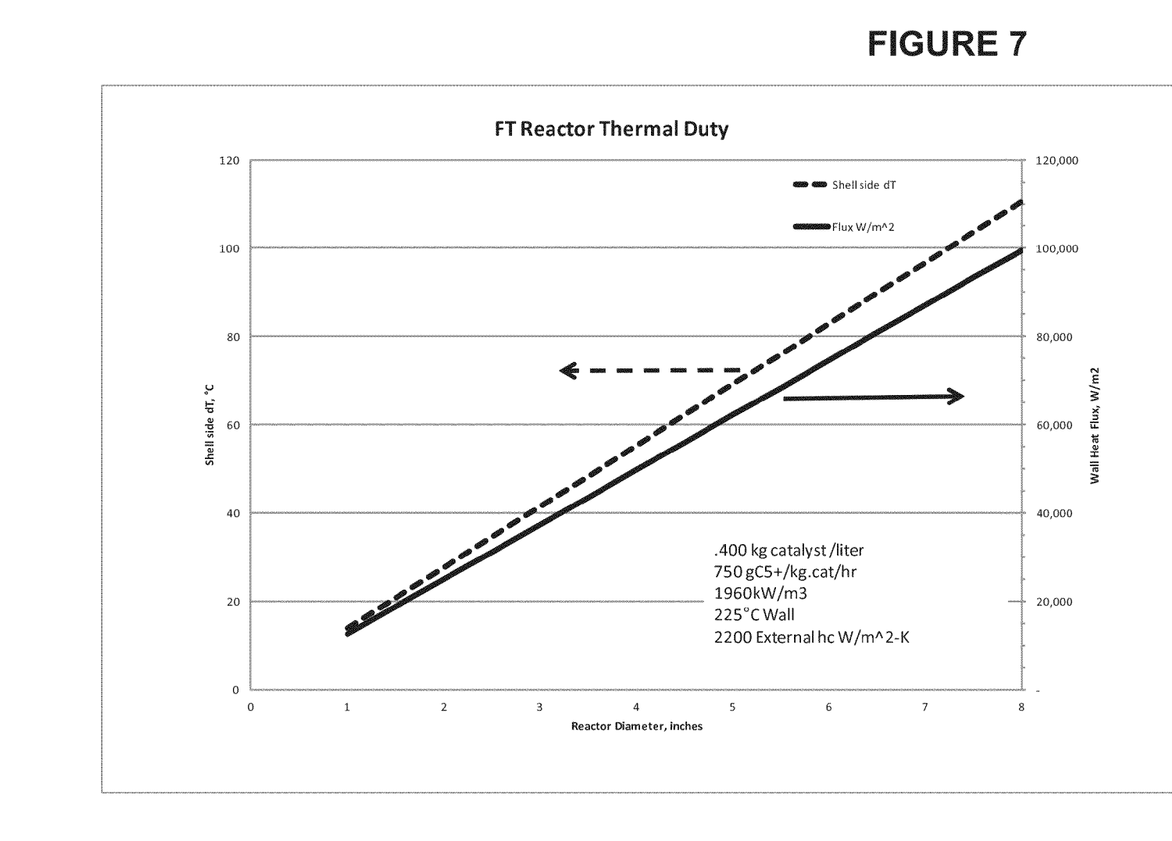
FIG. 7 is a graph of FT tube wall change in heat as a function of the diameter of the FT tube, and the FT tube wall heat flux as a function of the diameter of the FT tube.
Figure 8:
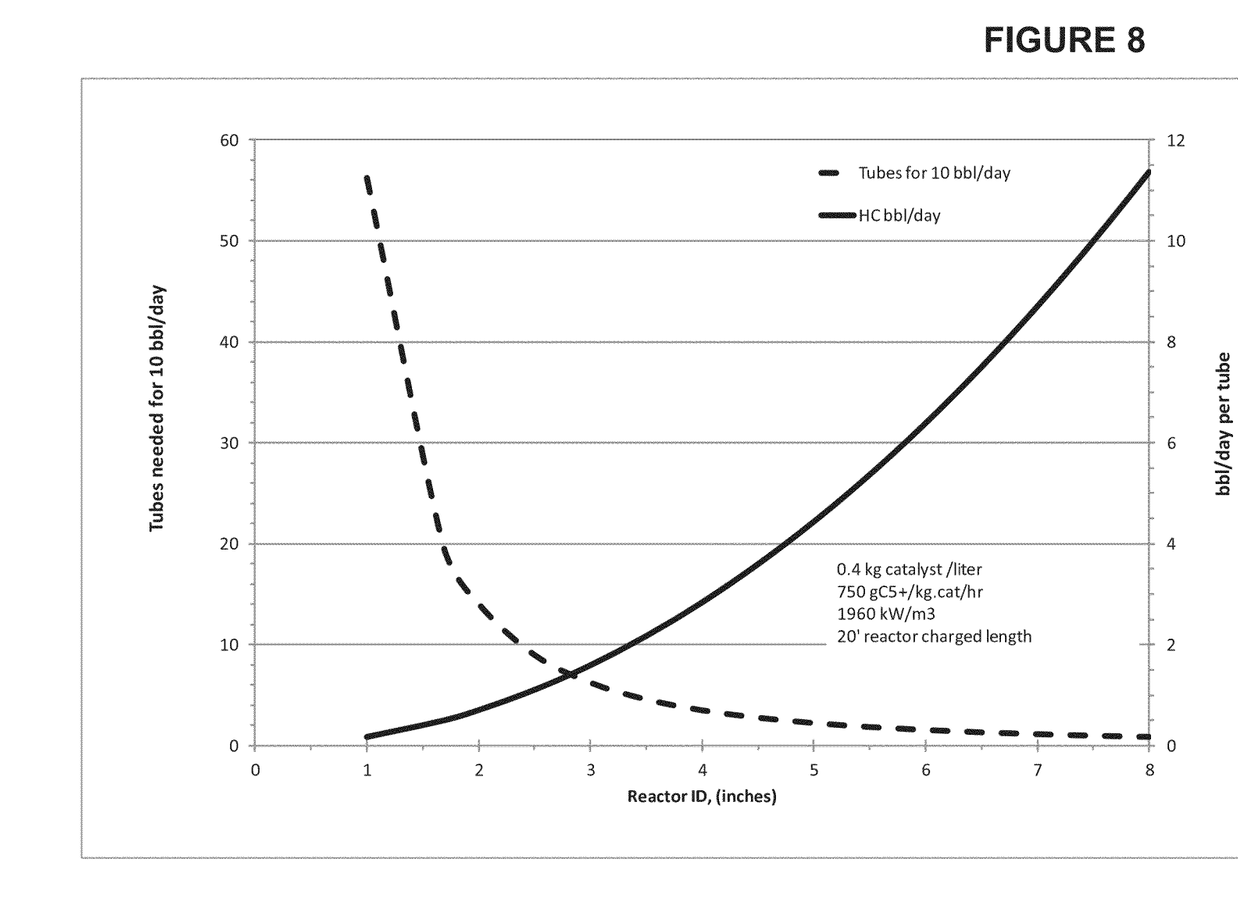
FIG. 8 is a graph of the FT reactor product as a function of the diameter of the FT tube, and the number of barrels of FT reactor product per day per FT tube as a function of the diameter of the FT tube.

The graphs shown in FIGS. 6-8 show the advantage of using an enhanced internal thermal management catalyst structures ("EITMCS"), which in one embodiment is a microfiber catalyst structure 200 and a FT compact unit 100. Specifically, these graphs show the advantages of the present embodiments in terms of temperature control, and the potential reactor size and productivity vs. reactor diameter. The graphs are based on reactor data and projected state of the art high activity catalyst.

As shown in FIG. 6, the expression for the temperature profile in a cylinder with constant heat generation is shown. At a given catalyst activity the heat generation rate $q'''$ is fixed. The effective bed conductivity k limits the maximum reactor tube diameter ($2*r_w$). A high effective bed conductivity allows the use of larger diameter reactors.

The Microfiber supported catalyst (which is sometimes called an "MFEC") can have an effective bed conductivity 50 times that of a conventional extrudate packed bed, allowing 7 times the reactor diameter for the same temperature difference. Alternatively, and/or additionally, embodiments of the present invention (including the use of the cooling block and the MFEC catalyst) could also incorporate an internal heat transfer fin or insert within the FT tube. This type of heat transfer fin/insert is described in U.S. Provisional Patent Application Ser. No. 61/600,501, filed Feb. 17, 2012 (which patent application is expressly incorporated herein by reference), may also be used to increase the effective bed thermal conductivity. In other words, the insert of the above-recited provisional patent application may be placed within the FT tube as a way of further dissipating heat from the interior of the tube. It should also be noted that U.S. Provisional Patent Application Ser. No. 61/601,134 (which patent application is expressly incorporated herein by reference) provides for a primary and secondary cooling mechanism (coolant flow) as an additional means to dissipate heat. In other words, the tubes of the present embodiments may be used in conjunction with the primary/secondary coolant flow mechanism of the above-recited provisional application. Those skilled in the art will appreciate that the embodiments of U.S. Provisional Patent Application Ser. No. 61/601,134 may also be used with the cooling MFEC catalyst structure or the other embodiments described herein.

The reactor tube must be capable of carrying off heat once heat has been conducted to the reactor tube wall. The graph of FIG. 7 shows the tube wall heat flux values vs. reactor size and the coolant $\Delta T$ assuming a typical value for a forced convection heat transfer coefficient hc. The present embodiments provide an improved means of supporting high reactor wall heat transfer while maintaining a very uniform temperature along the length of the reactor.

The reactor tube addresses heat removal at the wall, by a novel design with integrated primary and secondary bed temperature control. The graph of FIG. 8 shows the benefits associated with having a larger diameter reactor tube, in order to produce a desired number of bbl (barrels FT product) per day. As shown by the graph of FIG. 8, conventional FT reactors are limited to about 1" diameter for a less active catalyst to ⅝" or smaller diameter for a very active catalyst. However, the MFEC with the present embodiments, along with the heat transfer inserts as described in U.S. Provisional Patent Application Ser. No. 61/600,501 and that primary and secondary bed temperature control designs as described in U.S. Provisional Patent Application Ser. No. 61/601,134 allow the use of reactor tubes of up to 4" with the most active known catalyst or up to 10" with less active catalysts. This reduces the cost and complexity required for a given production rate.

All the patent applications and patents listed herein are expressly incorporated herein by reference.

What is claimed is:

1. A Fischer Tropsch ("FT") reactor comprising:
at least one FT tube;
a primary cooling fluid flow path that extends in a direction that is substantially parallel to the longitudinal length of the FT tube; and
a secondary cooling fluid flow path, wherein the secondary cooling fluid flow path circumscribes at least a length of the primary cooling fluid flow path and extends in a direction that is different than the direction of the primary cooling fluid flow path, wherein the secondary cooling fluid flow path is not in fluid communication with the primary cooling fluid flow path within the FT reactor.

2. The FT reactor according to claim 1, wherein a first quantity of coolant flows along the primary cooling fluid flow path and a second quantity of coolant flows along the secondary cooling fluid flow path.

3. The FT reactor according to claim 1, wherein the primary cooling fluid flow path extends in a substantially axial direction and the secondary cooling fluid flow path extends in a direction that is substantially perpendicular to the direction of the primary cooling fluid flow path.

4. The FT reactor according to claim 1, wherein the primary cooling fluid flow path is defined by an external pipe, wherein the at least one FT tube fits within the external pipe.

5. The FT reactor according to claim 4, wherein a first quantity of coolant flows along the primary cooling fluid flow path along the outside of the at least one FT tube and along the inside of the external pipe.

6. The FT reactor according to claim 5, wherein the secondary cooling fluid flow path is defined by a plurality of baffles, wherein each baffle comprises an opening through which the at least one FT tube, the external pipe, and the first quantity of coolant may flow along the primary cooling fluid flow path.

7. A Fischer Tropsch ("FT") reactor comprising:
an external tube housing a plurality of FT reactor tubes;
a plurality of baffles within the external tube housing, wherein each baffle comprises at least one opening;
a primary cooling fluid flow path that extends in a substantially axial direction through an external pipe within the external tube housing, wherein a first quantity of cooling fluid may flow in a substantially axial direction through the external pipe along the primary cooling fluid flow path by passing through the at least one opening in each of the baffles; and;
a secondary cooling fluid flow path that extends in a substantially horizontal direction within the external tube housing, wherein a second quantity of cooling fluid may flow in a substantially horizontal direction through the external tube housing along the secondary cooling fluid flow path.

8. The FT reactor according to claim 7, wherein the plurality of baffles form one or more chambers within the external tube housing, wherein there is a secondary cooling fluid flow path that extends in a substantially horizontal direction within each of the chambers within the external tube housing.

9. The FT reactor according to claim 8, wherein the second quantity of cooling fluid may be allowed to boil within one of the chambers, wherein the first quantity of cooling fluid is not allowed to boil within the external pipe.

10. The FT reactor according to claim 8, wherein the amount of the second quantity of cooling fluid and the flow rate of the second quantity of cooling fluid may be adjusted within a particular chamber to ensure that each chamber has is maintained at a desired temperature.

11. The FT reactor according to claim 8, wherein the diameter of the at least one opening in each baffle is greater than the diameter of the FT reactor tube, wherein the FT reactor tube passes through the at least one opening in each baffle and creates an annulus within the opening, wherein the first quantity of cooling fluid flows through the annulus within the external pipe.

12. The FT reactor according to claim 6, wherein the secondary cooling fluid flow path flows along an outside of the external pipe and along an inside of an outer shell.

13. A Fischer Tropsch ("FT") reactor comprising:
an outer shell;
a pipe extending longitudinally through the outer shell;
a FT tube extending longitudinally through the pipe, wherein an annular space between the FT tube and the pipe forms a first cooling fluid flow path within the FT reactor to transfer heat from the FT tube to a first cooling fluid within the first cooling fluid flow path; and
a plurality of baffles extending laterally through the outer shell to form a plurality of segmented chambers, each segmented chamber to form a second cooling fluid flow path within the FT reactor to transfer heat from the first cooling fluid to a second cooling fluid within the second cooling fluid flow path.

14. The FT reactor according to claim 13, further comprising an inlet and an outlet to facilitate circulation of the first cooling fluid through the first cooling fluid flow path.

15. The FT reactor according to claim 13, further comprising an inlet and an outlet for each segmented chamber to facilitate circulation of the second cooling fluid through the corresponding second cooling fluid flow path.

\* \* \* \* \*